UNITED STATES PATENT OFFICE.

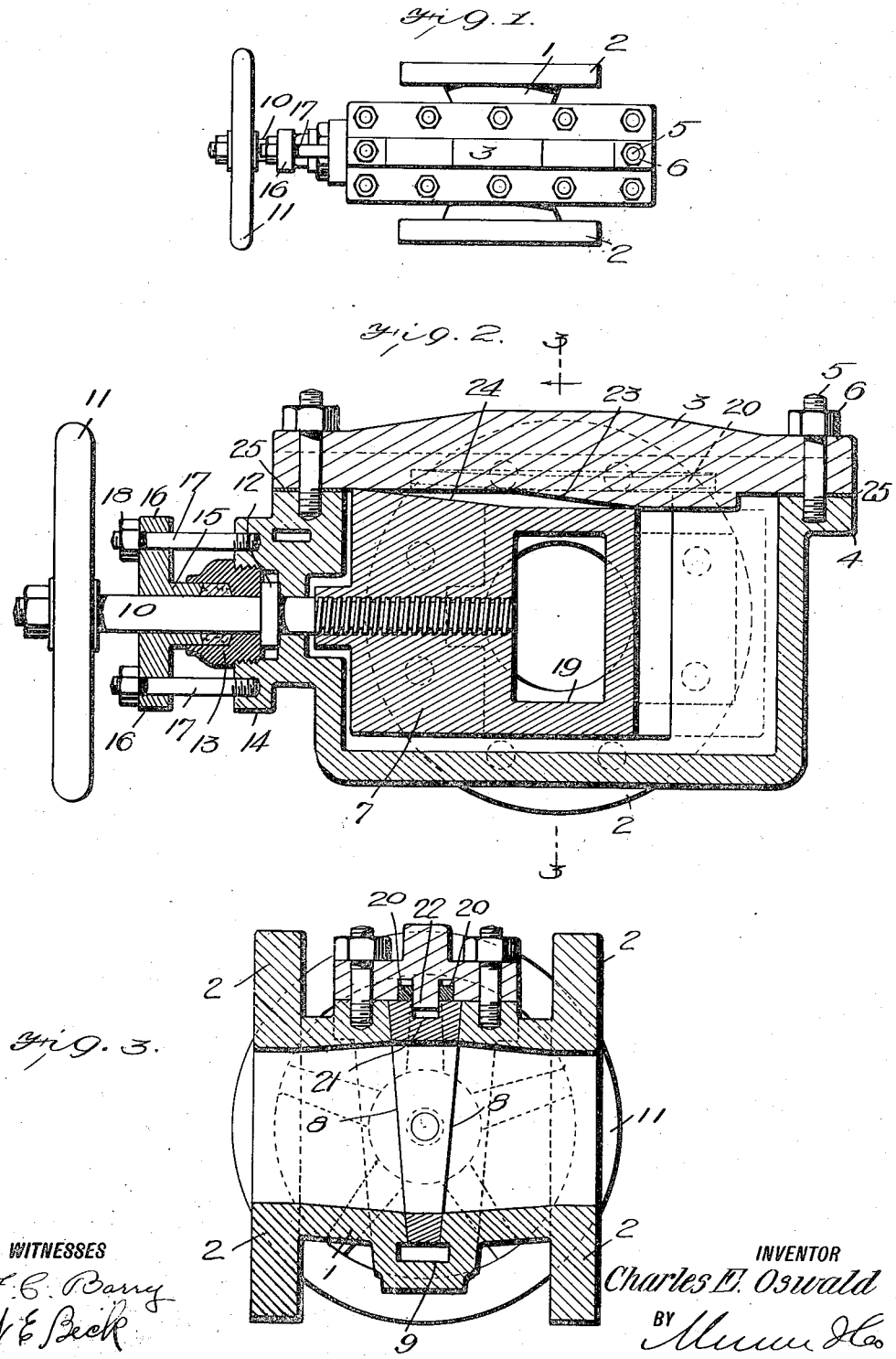

CHARLES E. OSWALD, OF SAN FRANCISCO, CALIFORNIA, ASSIGNOR OF ONE-HALF TO DANIEL E. KEPPELMANN, OF SAN FRANCISCO, CALIFORNIA.

GATE-VALVE.

1,245,961.  Specification of Letters Patent.  Patented Nov. 6, 1917.

Application filed December 29, 1916. Serial No. 139,466.

*To all whom it may concern:*

Be it known that I, CHARLES E. OSWALD, a citizen of the United States, and a resident of San Francisco, in the county of San Francisco and State of California, have made certain new and useful Improvements in Gate-Valves, of which the following is a specification.

My invention is an improvement in gate valves, and has for its object to provide a valve which will be tight at all times, irrespective of wear and length of service, and irrespective of presence of foreign matter wherein the valve is wedge-shaped and moves between wedge-shaped seats, and wherein the seat is not exposed to liquids or gases carried in the pipe line through the valve.

In the drawings:

Figure 1 is a top plan view of the improved valve,

Fig. 2 is a longitudinal section, and

Fig. 3 is a section on the line 3—3 of Fig. 2, looking in the direction of the arrow, adjacent to the line.

In the present embodiment of the invention a casing 1 is provided, having at its ends, marginal flanges 2 for permitting the casing to be interposed in the pipe line, and connected with the ends of the pipe. The top of the casing is closed by a cover plate 3, and the said top has a flange 4 upon which the cover plate fits, and the cover plate is secured in place by stems 5 which are threaded into the casing at the flange, and which pass through the openings in the cover plate and are engaged by nuts 6 above the cover plate.

The casing has a wedge-shaped opening, in which moves the wedge-shaped gate valve 7, and the said valve moves between inclined surfaces 8, the said surfaces converging toward the bottom of the casing. At the bottom and below the opening of the valve is a trough or gutter 9, and the valve is moved by means of a stem 10, which has threaded engagement with the valve, and is provided with a hand-wheel 11 at its outer end for convenience in manipulating the same.

The stem is prevented from longitudinal movement by a collar 12, fixed on the stem and engaged between the adjacent end of the casing, and one of the sections 13 of a packing gland, which is threaded into an extended nipple 14 on the end of the casing. This section 13 of the packing gland is recessed at its outer end to contain a packing 13ª and the other section 15 of the packing gland extends within the recess so that the packing 13ª may be compressed on the stem. This section 15 has laterally extending lugs 16, through which pass a pair of stems 17 threaded into the nipple, and passing through openings in the lugs and engaged by nuts 18 outside the lugs. It will be evident that by turning the nuts the packing may be compressed as tightly as may be necessary on the stem.

The gate valve has a transverse opening 19 which may be registered with the bore of the casing, or may be moved out of registry therewith by means of the stem 10. Arched springs 20 are arranged above the valve, the said springs bearing on the valve and normally holding it tightly on its seat, and the valve has a longitudinally extending groove 21 in its upper edge, which is engaged by a depending rib 22, between the springs.

It will be noticed from an inspection of Fig. 2 that the cover plate has an inclined surface 23, and that the valve has a similar surface 24 at the end adjacent to the stem 10. When the valve is closed, these surfaces 23, 24, coöperate to force the valve downward and the tighter the valve is turned to close the pipe line, the more closely it will be pressed into contact with the seat to prevent escape of fluids.

With the improved valve, burning out the seats is impossible for the seat is never exposed, when the valve is opened or closed, the sliding valve constantly riding on the seat.

The life of the seat is further increased by the automatic compensation for wear brought about by the springs 20. The bonnet of the valve is packed with graphite, which slowly seeps around the stem, gradually reaching the sliding wedge, and constantly providing automatic lubrication.

A thin metallic gasket 25 is arranged between the cover plate and the body of the valve for providing a tight seal at this point. The valve may be more cheaply constructed, since the seats may be of cast iron, instead of bronze or brass, as in the ordinary construction of valve.

With the ordinary style of valve, systems employing both high and low pressures are compelled to use different style valves, precluding standardization. With the present valve, however, standardization is possible since it is applicable to either high or low pressure of liquid or gaseous substances.

I claim:

1. A valve, comprising a casing having a longitudinal opening, with its side walls oppositely inclined transversely, a gate valve operable longitudinally in the opening of the casing for controlling the passage of fluid therethrough, the faces of the valve being oppositely inclined and in contact with the transversely inclined side walls of the said longitudinal opening, and yieldable means between the larger longitudinal edge or base, of the valve, and the casing to exert a constant edgewise pressure on the valve, the valve having a portion of its larger edge inclined longitudinally and the casing having a portion correspondingly inclined longitudinally, the said inclined portions coacting to positively seat the valve when closed.

2. A valve, comprising a casing having a longitudinal opening, with its side walls oppositely inclined transversely, said casing having a longitudinal gutter in the lower wall of the opening and the top wall of such opening formed with a longitudinal rib and a longitudinally inclined portion, a valve operable longitudinally in the opening and having its faces transversely inclined, the wider edge or base of the valve having a longitudinally inclined portion to coöperate with the longitudinally inclined portion of the casing, and flat springs disposed within the casing upon opposite sides of the rib and exerting a constant edgewise pressure on the valve.

CHARLES E. OSWALD.

Witnesses:
 C. A. NICKSON,
 B. G. DURKIN.